No. 617,901. Patented Jan. 17, 1899.
M. C. MASSIE.
APPARATUS FOR PRODUCING ELECTRIC CURRENTS.
(Application filed Oct. 11, 1898.)
(No Model.) 2 Sheets—Sheet 1.
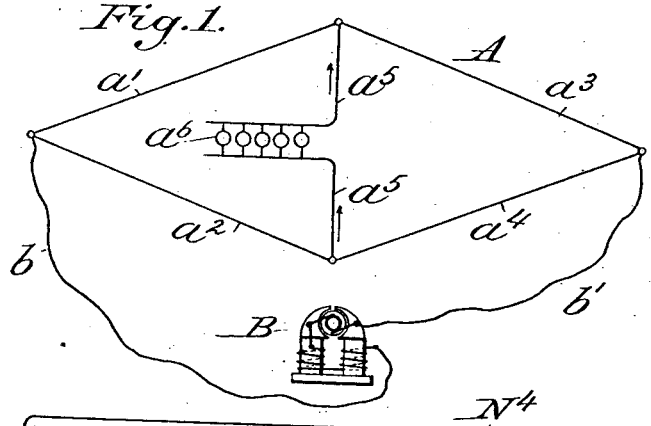
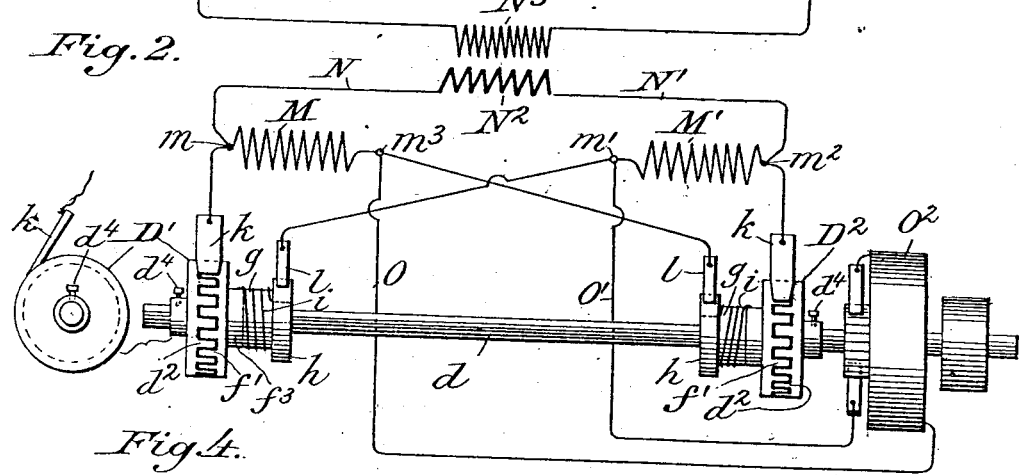
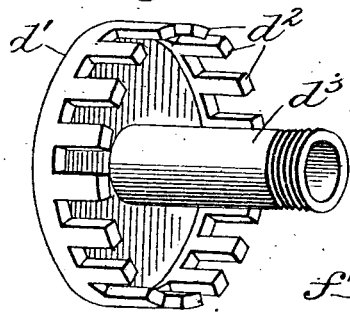
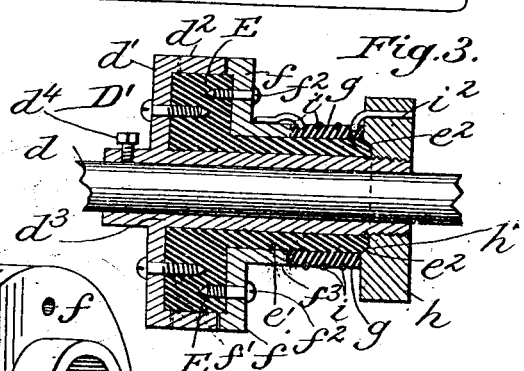
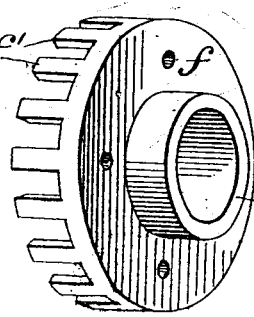
Witnesses
F. H. Schott
N. Mitchell
Inventor
Mitford C. Massie
by Max Georgii
his Attorney No. 617,901.  
M. C. MASSIE.  
APPARATUS FOR PRODUCING ELECTRIC CURRENTS.  
(Application filed Oct. 11, 1898.)  
(No Model.)  
Patented Jan. 17, 1899.  
2 Sheets—Sheet 2.

UNITED STATES PATENT OFFICE.

MITFORD C. MASSIE, OF WASHINGTON, DISTRICT OF COLUMBIA.

APPARATUS FOR PRODUCING ELECTRIC CURRENTS.

SPECIFICATION forming part of Letters Patent No. 617,901, dated January 17, 1899.

Application filed October 11, 1898. Serial No. 693,214. (No model.)

*To all whom it may concern:*

Be it known that I, MITFORD C. MASSIE, a citizen of the United States, residing at Washington, in the District of Columbia, have invented certain new and useful Improvements in Apparatus for Producing Electric Currents; and I do hereby declare the following to be a full, clear, and exact description of the invention, such as will enable others skilled in the art to which it appertains to make and use the same.

My invention relates to improvements in the art of producing electric currents.

The object of my invention is to provide means whereby an alternating current may be converted into a direct current or a direct current into a vibratory current either interrupted or alternating, as may be desired.

An apparatus embodying my invention comprises the essential features of what is known in the art as the "Wheatstone bridge," means for continuously alternately balancing and unbalancing the resistances of the branches of said bridge, and means for supplying the bridge with current.

My invention will first be described in connection with the accompanying drawings and then particularly pointed out in the claims.

Figure 6:
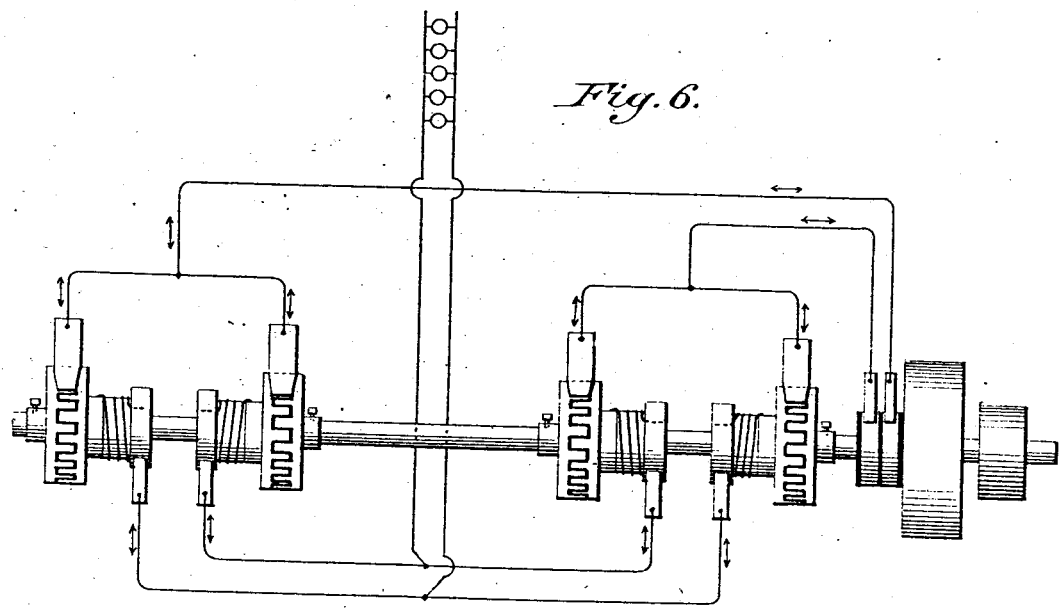
Figure 7:
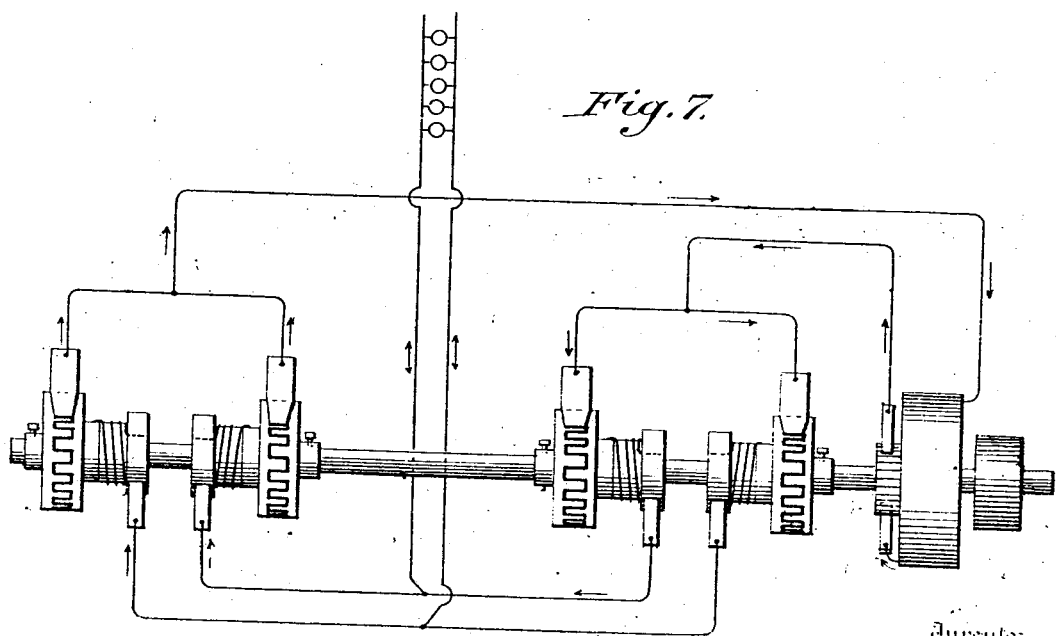

Referring to the drawings, Figure 1 is a diagrammatic view of a Wheatstone bridge, illustrating my invention; Fig. 2, a similar view showing an apparatus embodying my invention arranged to produce vibratory direct currents; Fig. 3, a longitudinal section, partly in elevation, of one form of resistance-changer embodying a part of my invention; Figs. 4 and 5, detail perspective views of parts of said resistance-changer; Fig. 6, a view similar to Fig. 2, showing an apparatus for changing an alternating current into a direct current; and Fig. 7, a similar view showing an apparatus for changing a direct current into an alternating one.

Referring to Fig. 1 of the drawings, A is a Wheatstone bridge having the four branches $a'$ $a^2$ $a^3$ $a^4$ and the bridge-conductor $a^5$. This bridge-conductor is shown in Fig. 1 as including the electric lamps $a^6$ and in my apparatus serves as the work-circuit. The terminals of the bridge are connected by conductors $b$ $b'$ to the poles of the dynamo or other generator B. In such a bridge when the resistance in the branch $a'$ is to the resistance in the branch $a^3$ as the resistance in the branch $a^2$ is to the resistance in the branch $a^4$ the resistances are said to be balanced, and no current will cross the bridge-conductor $a^5$; but when these branches are not so balanced a current will cross the said bridge-conductor $a^5$.

If the current supplied to the terminals of the bridge be a direct current and the resistances in two of the branches—for example, $a^2$ $a^3$—be reduced while the resistances of the branches $a'$ $a^4$ be increased or maintained higher than that of the branches $a^2$ $a^3$, a current will flow across the bridge-conductor $a^5$, for example, in the direction of the arrow, Fig. 1. If now the resistances in the branches $a^2$ $a^3$ be increased and that in the branches $a'$ $a^4$ be reduced, a current will flow through the bridge-conductor $a^5$ in a direction opposite to that indicated by the arrow. Thus it will be seen by repeatedly and alternately altering the resistances of the branches in the manner described an alternating current may be produced in the said bridge-conductor. If, however, the resistance of the branches $a'$ $a^4$ be maintained at a normal amount, while the resistance of the branches $a^2$ $a^3$ be varied synchronously from a maximum to a minimum, a current will flow across the bridge-conductor $a^5$ in one direction only and at the time when the bridge is unbalanced. In this manner a vibratory or interrupted direct current may be produced in the said bridge-conductor.

For high-tension currents the apparatus may be so arranged that the branches are balanced at a high resistance and are unbalanced by reducing the resistances of two diametrically opposite branches—as, for instance, $a^2$ $a^3$.

In order to carry out the general principles explained in connection with Fig. 1, I introduce a rotary resistance-changer into one or more branches of a Wheatstone bridge.

In Fig. 2 I have shown diagrammatically an arrangement for producing an interrupted direct current, this apparatus being intended for use with currents of high voltage.

Referring to Fig. 2, M M' are resistance-coils introduced into two diametrically opposite branches of the bridge, while D' D² are rotary resistance-changers arranged to introduce into the two remaining branches resistances equal to those indicated at M M' and then to remove or reduce said resistances simultaneously, this introduction of a high resistance and removal of the same being repeated at a rapid rate equal to the number of interruptions (for a unit of time) which it is desired to produce in the bridge-conductor.

By substituting low resistances for M M' the bridge will balance on low resistances, which is desirable for currents of low voltage.

The resistance-changer may be constructed in any desired form which allows this repeated and alternate balancing and unbalancing of the resistances of the four branches, the preferred construction of such resistance-changer being as follows: $d$, Fig. 3, is a shaft which may be rotated in any suitable manner and may, if desired, be a continuation of the dynamo-shaft. Upon this shaft are mounted resistance-changers, each comprising a disk $d'$, having crown-teeth $d^2$ and a hub or sleeve $d^3$, fitting snugly on the shaft $d$ and arranged to be secured thereto by a screw $d^4$. Surrounding the hub $d^3$ and within the circle of crown-teeth $d^2$ is a disk E, of insulating material, having a sleeve $e'$ shorter than the hub $d^3$ and having its end beveled, as shown at $e^2$, for a purpose hereinafter described.

$f$ is a disk having crown-teeth $f'$ arranged to project between the crown-teeth $d^2$ of the disk $d'$, the openings between the teeth $d^2$ being somewhat larger than the teeth $f'$ in order that there may be no contact between the two sets of teeth. The said disk $f$ is provided with a short hub $f^3$, fitting tightly over the sleeve $e'$ of the insulating-disk $e$. A series of screws $f^2$ pass through the said disk $f$ into the insulating-disk $e$ and thereby hold these two parts together. A collar $g$, of insulating material and provided on its exterior surface with helical grooves, is placed upon the sleeve $e'$ and bears against the end of the hub $f^3$. A contact-ring $h$ is threaded upon the outer end of the hub $d^3$ and provided with an annular coned recess, (indicated at $h'$,) which receives the beveled end $e^2$ of the sleeve $e'$. By screwing up this contact-ring $h$ the parts are clamped together firmly.

In the helical groove of the insulating material $g$ is placed a resistance-coil $i$, having one end $i'$ soldered or otherwise connected to the hub $f^3$ of the disk $f$, while the other end $i^2$ of said resistance-coil is secured to the contact-ring $h$, as by inserting said end $i^2$ through a hole in the contact-ring $h$ and soldering it therein.

It will be seen that the teeth $f'$ $d^2$ form segments of a commutator, the set of teeth $d^2$ being in direct electrical connection with the contact-ring $h$, while the set of teeth $f'$ communicate with said contact-ring $h$ only through the resistance-coil $i$. Against the periphery of this commutator bears a brush $k$, which will come into contact alternately with the two sets of teeth as the resistance-changer is rotated. A similar brush $l$ bears against the contact-ring.

In the practical construction of my device the brush $k$, for example, of one resistance-changer may be connected to one end $m$ of the resistance-coil M, Fig. 2, the other brush $l$ of said resistance-changer being connected to the terminal $m'$ of the resistance-coil M'. The brush $k$ of the other resistance-changer is connected to the terminal $m^2$ of the resistance-coil M', while its brush $l$ is connected to the terminal $m^3$ of the resistance-coil M. The terminals $m$ and $m^2$ of the two resistance-coils form the poles of the work-circuit. The work-conductors N and N' are shown as leading therefrom and arranged to supply currents to the primary coil $N^2$ of a transformer whose secondary coil $N^3$ is included in a circuit completed by the conductor $N^4$.

The terminals $m^3$ $m'$ of the resistance-coils M and M', respectively, are connected by the conductors O O' to the two poles of a direct-current generator $O^2$, the shaft of said generator being shown as extended to connect with or form part of the shaft $b$ of the resistance-changers.

The various parts are so arranged that when the brush $k$ of one resistance-changer is in contact with the teeth or segments $f'$ of its commutator the corresponding brush $k$ of the other resistance-changer will be in a similar position and the resistance from the terminal $m'$ of one resistance-coil M' to the terminal $m$ of the other resistance-coil M will bear to the resistance of said coil M the same proportion that the resistance of the coil $m'$ bears to the total resistance from the terminal $m^2$ through the corresponding resistance-changer to the terminal $m^3$. Therefore the bridge will be in balance when the brushes $k$ are in contact with their corresponding teeth or segments $f'$, and no current will pass across the bridge-conductor formed by the wires N N' and the primary coil $N^2$; but as soon as the shaft $d$ is rotated so as to bring the teeth $d^2$ of the resistance-changers beneath their corresponding brushes $k$ the current flows directly to the brushes $l$ instead of through the resistance-coils $i$, and hence the resistances of the two diametrically opposite branches containing the resistance-changers is much lower than the resistances of the diametrically opposite branches containing the resistance-coils M M'. In this manner the bridge is unbalanced and a current flows through the work-conductors N N' and the primary coils $N^2$. A further rotation of the shaft $d$ again brings the brushes $k$ into contact with the teeth or segments $f'$ of the corresponding resistance-changers, and the bridge is again balanced, whereupon the current through the conductors N N' and primary coil $N^2$ is interrupted. The continued rotation of the resistance-changers causes a repetition of this action, and therefore produces a vibratory current in the primary coil $N^2$ and in the conductors N N'. This in turn sets up a secondary current in the secondary coil $N^3$, which may be used as desired in the circuit $N^4$.

I have illustrated the conductors N N' as connected with the primary coil $N^2$ of the transformer; but it is obvious that the current in said conductors N N' may be used in any other desired manner.

As the resistance-changers introduce the maximum resistances into their respective branches before removing the minimum resistances, and vice versa, it is obvious that there will be but a limited amount of sparking at the brushes $k$.

In order to produce a direct current from an alternating current, I insert a resistance-changer in each branch of the bridge, these resistance-changers being set so that those diametrically opposite each other form a pair, the two pairs rotating simultaneously, so that when one pair introduces a maximum resistance into its respective branch the corresponding opposite pair will introduce a minimum resistance into their own respective branches, and vice versa. The rotation of all the resistance-changers is such that the variation from a maximum to a minimum is synchronous with the alternation of the current, which is supplied from any source—such, for instance, as an alternating generator. This construction is shown in Fig. 6. By this arrangement the alternating current flows across the bridge-conductor in alternately opposite directions; but since it is an alternating current and since the variations of the resistances are synchronous with the alternations the current produced in the bridge-conductor is a direct one. By employing the same construction with a source of direct current an alternating current may be produced in the bridge-conductor, as will be plain from Fig. 7.

Having thus fully described my invention, what I claim as new, and desire to secure by Letters Patent of the United States, is—

1. The combination with a Wheatstone bridge, of means for repeatedly and alternately balancing and unbalancing the resistances of the branches of said bridge, and means for energizing the branches, whereby a current is produced in the bridge-conductor.

2. The combination, with a Wheatstone bridge, of means in two diametrically opposite branches of the bridge for repeatedly and alternately balancing and unbalancing the resistances of the branches of said bridge, and means for energizing the branches, whereby a vibratory current is produced in the bridge-conductor.

3. The combination, with a Wheatstone bridge, of a generator of alternating current having its terminals connected to the terminals of the Wheatstone bridge, and resistance-changers in each of the branches of the bridge for repeatedly and alternately altering the resistances of the respective bridges from a maximum to a minimum, one pair of resistance-changers in diametrically opposite branches being arranged to introduce the maximum resistances into their respective branches when the remaining pair of resistance-changers introduce the minimum resistances into their respective branches, and means for operating the resistance-changers from a maximum to a minimum simultaneously, and synchronously with the alterations of the generating-current, whereby the latter produces a direct current in the bridge-conductor.

In testimony whereof I affix my signature in presence of two witnesses.

MITFORD C. MASSIE.

Witnesses:
N. MITCHELL,
ANTON GLOETZNER.